United States Patent [19]
Laflin et al.

[11] Patent Number: 5,306,050
[45] Date of Patent: Apr. 26, 1994

[54] APPARATUS FOR INTERNALLY CONNECTING TO COILED TUBING

[75] Inventors: Walter J. Laflin, Houston; Brian K. Moore, Humble, both of Tex.

[73] Assignee: Camco International Inc., Houston, Tex.

[21] Appl. No.: 13,385

[22] Filed: Feb. 4, 1993

Related U.S. Application Data

[63] Continuation-in-part of Ser. No. 988,089, Dec. 9, 1992, Pat. No. 5,238,273, which is a continuation of Ser. No. 744,152, Aug. 13, 1991, abandoned.

[51] Int. Cl.$^5$ ............................................. F16L 55/00
[52] U.S. Cl. .................................. 285/119; 285/175; 285/323; 285/370
[58] Field of Search ............... 285/322, 323, 370, 397, 285/258, 421, 55, 286, 175, 119, 255; 294/81.14, 86.22, 86.24, 86.25, 94, 96

[56] References Cited

U.S. PATENT DOCUMENTS

| | | | |
|---|---|---|---|
| 1,653,547 | 12/1927 | Cameron | 294/96 X |
| 1,819,652 | 8/1931 | Metcalf | 285/323 |
| 1,821,328 | 9/1931 | Segelhorst | 285/175 |
| 3,638,969 | 2/1972 | Serrano | 285/370 X |
| 3,742,582 | 7/1973 | Broske | 285/370 X |
| 3,876,233 | 4/1975 | Schmedding et al. | 285/370 X |
| 3,993,334 | 11/1976 | Fridman et al. | 285/370 X |
| 4,682,657 | 7/1987 | Crawford | 166/385 |
| 4,813,717 | 3/1989 | Watts | 285/379 X |
| 4,844,166 | 7/1989 | Going et al. | 166/379 |
| 4,946,200 | 8/1990 | Belnkush | 285/255 X |

*Primary Examiner*—Dave W. Arola
*Attorney, Agent, or Firm*—Fulbright & Jaworski

[57] ABSTRACT

A ratchet-type spoolable connector for coupling coiled tubing to tools or other coiled tubing. A mandrel is engaged by a ratchet to the inside of a body and slips abut the end of the body and engage the mandrel. The alternate application of tension and compression across the connector ratchets the mandrel into wedging engagement with the slips for gripping the coiled tubing.

6 Claims, 5 Drawing Sheets

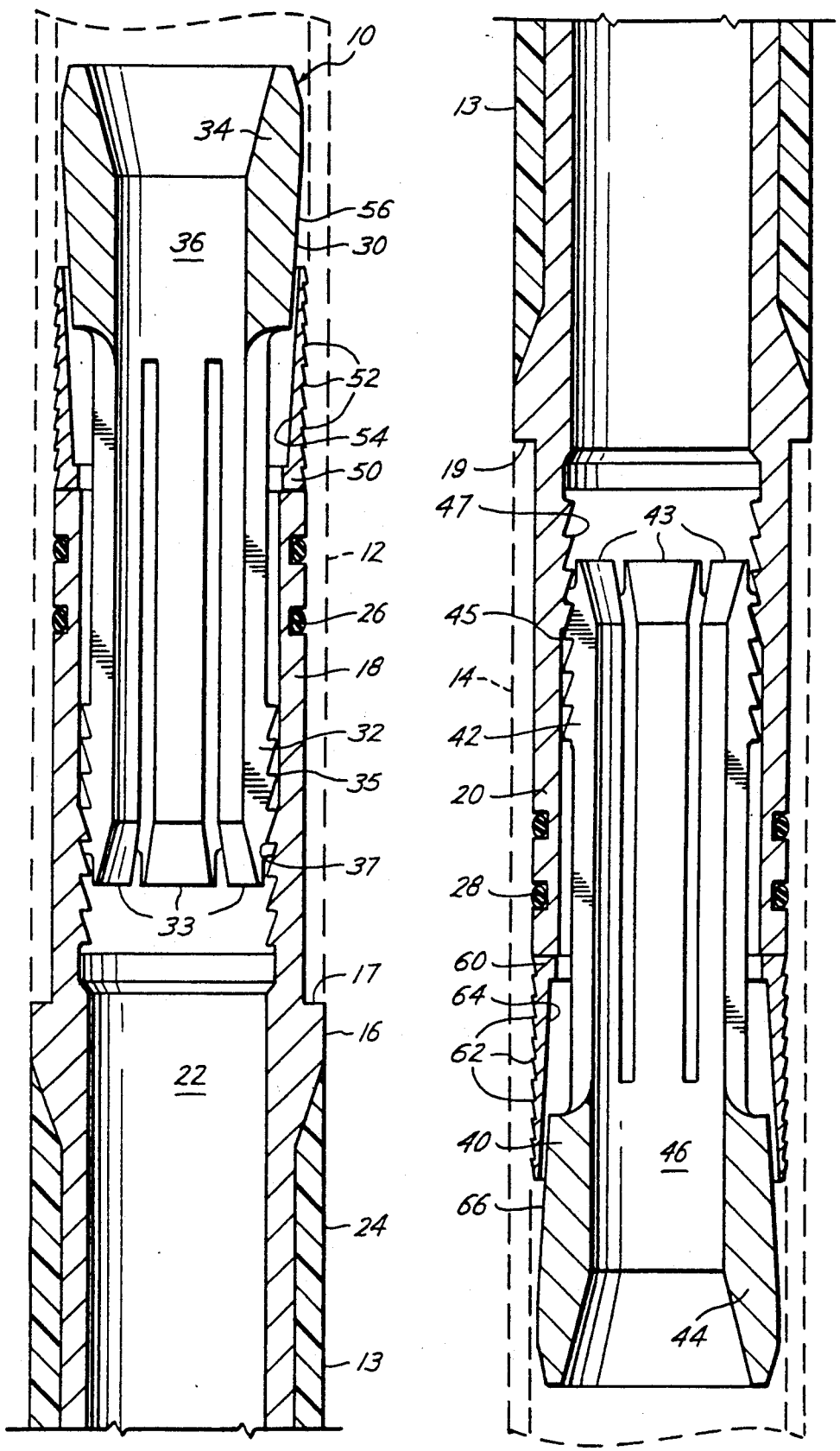

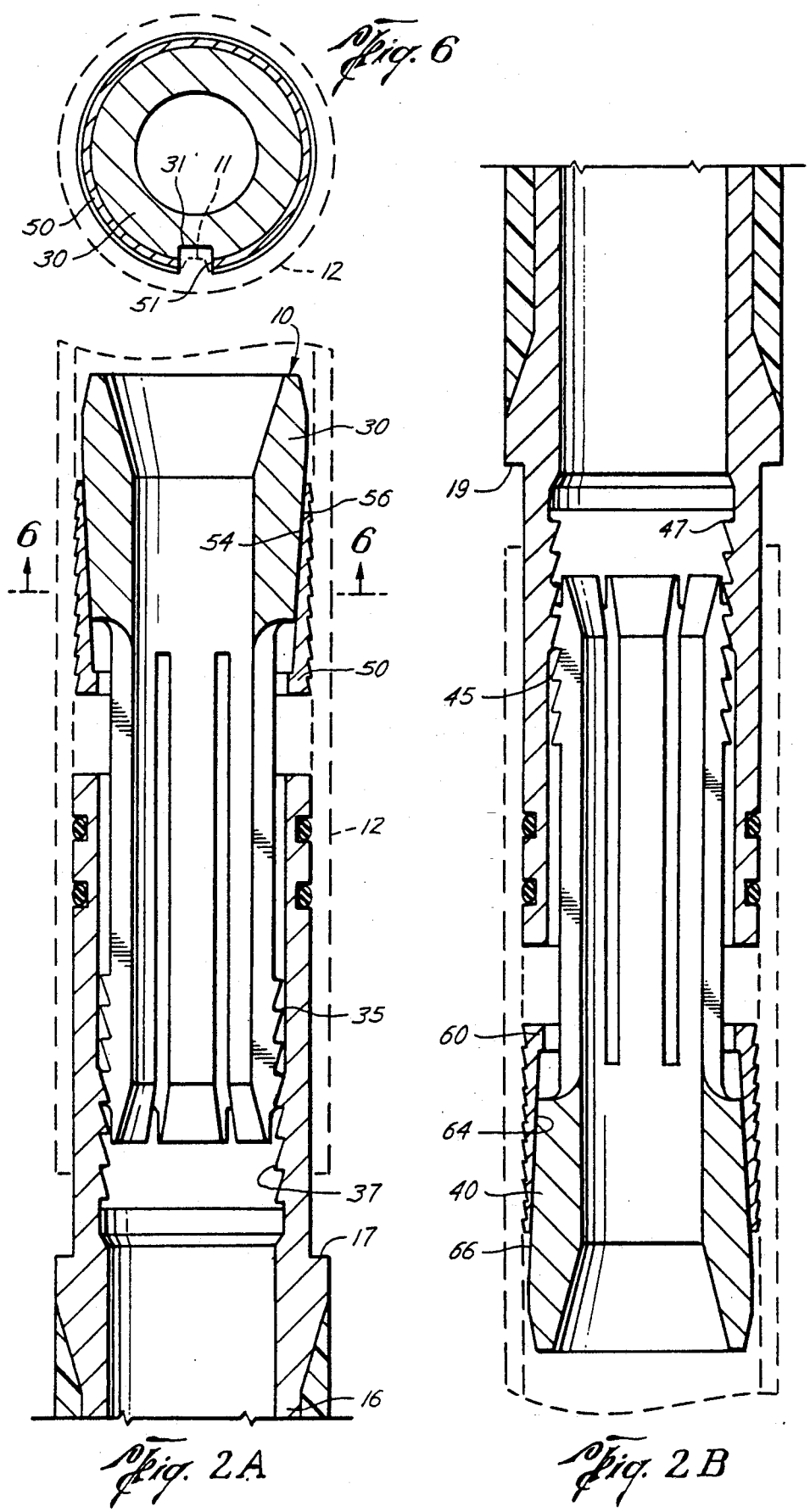

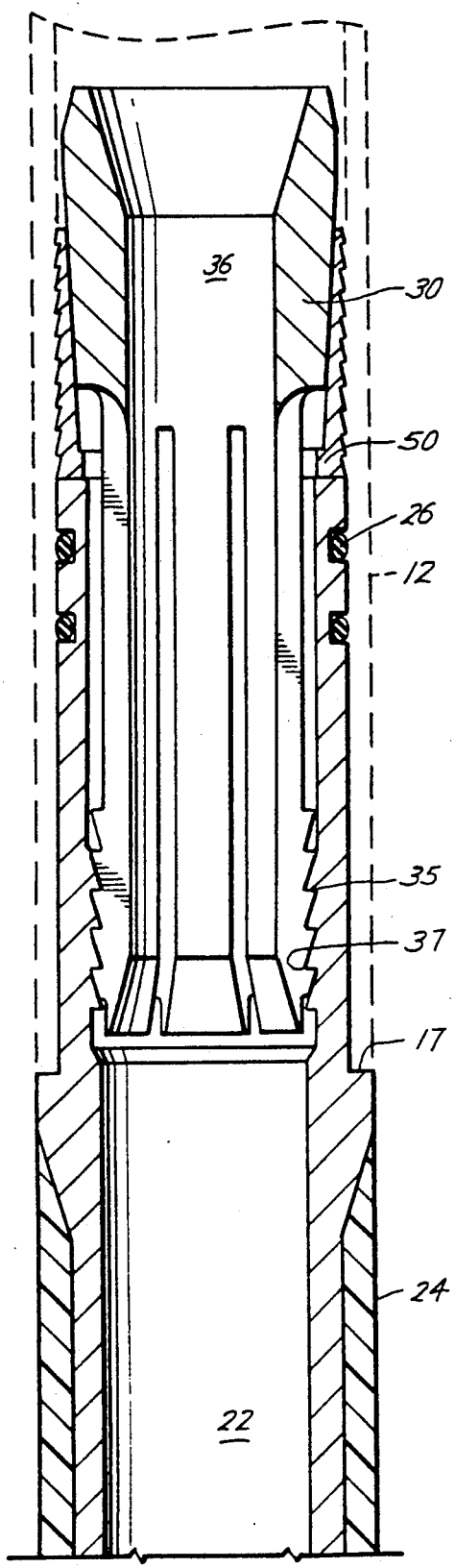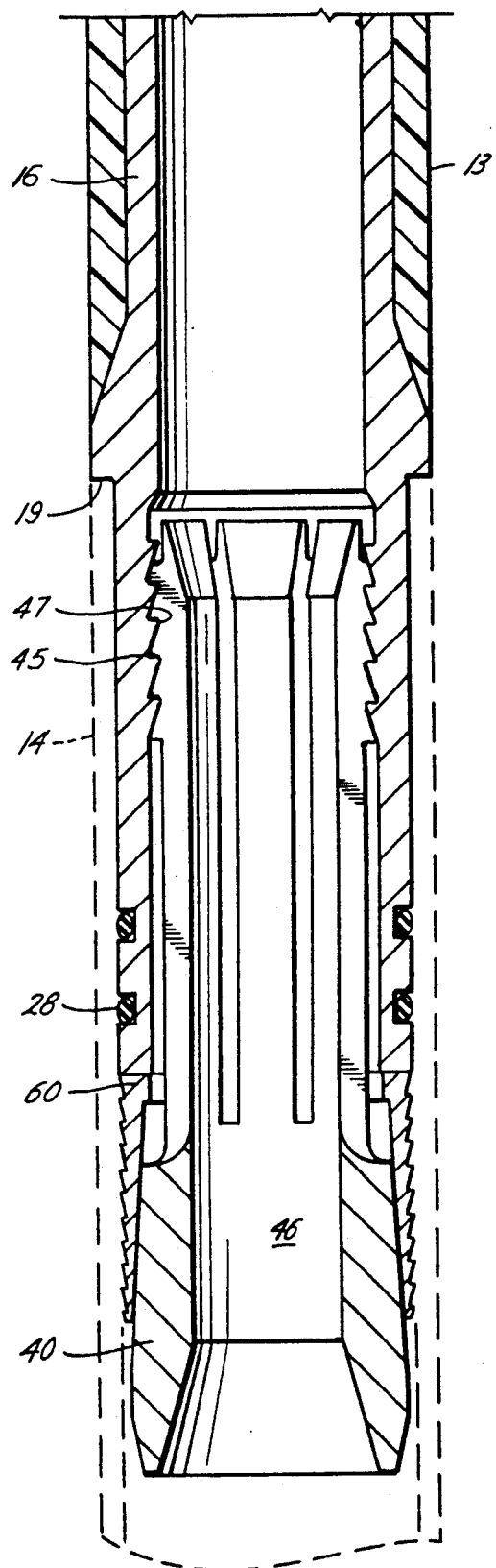
Fig. 3A
Fig. 3B

APPARATUS FOR INTERNALLY CONNECTING TO COILED TUBING

CROSS-REFERENCES TO RELATED APPLICATIONS

This application is a continuation in part to patent application Ser. No. 07/988,089, filed Dec. 9, 1992, entitled "Method and Apparatus for Internally Connecting to Coiled Tubing", now Pat. No. 5,238,273 which is a continuation of patent application Ser. No. 07/744,152, filed Aug. 13, 1991, entitled "Method and Apparatus for Internally Connecting to Coiled Tubing", now abandoned.

BACKGROUND OF THE INVENTION

The present invention is directed to connecting lengths of well coiled tubing or connecting tools to coiled tubing.

Coiled tubing is a continuous conduit without joints used in an oil/gas well carried on a spool or reel at the well surface. The coiled tubing can be lowered into an oil and/or gas well and is of a small diameter, for example, one to two inches. Coiled tubing can be used for installing and operating a variety of well accessories, such as disclosed in U.S. Pat. No. 4,844,166. Interconnection of the coiled tubing with other links of coiled tubing and well tools has been accomplished in the past, as described in U.S. Pat. No. 4,682,657, by providing a connector gripping the exterior of the coiled tubing. However, such connectors inherently provide an outside diameter which is greater than the outside diameter of the coiled tubing. This provides difficulty in allowing the coiled tubing and connector to sealingly and freely pass through the injector chains, around the gooseneck, and onto the coiled tubing spool or reel. Furthermore, such connectors are not spoolable. That is, they cannot be wound up on the spool or coiled tubing reel a number of times without losing pressure and tensile integrity.

The present invention is directed to a method and apparatus which internally grips and connects to the coiled tubing by an internal ratchettype spoolable connector which avoids the disadvantages of the prior art connections by being spoolable, will sealably pass through packoffs, by having an outer body size no greater than the outside diameter of the coiled tubing, and can withstand a number of cycles of being spooled and unspooled without losing pressure or tensile integrity.

SUMMARY

The present invention is directed to a well connector connectable to the inside of one end of a well coiled tubing for coupling the coiled tubing to another member and includes a circular body having first and second ends and a bore therethrough and an outside diameter of a size no greater than the outside diameter of the coiled tubing. The first end of the body has an outside diameter substantially equal to the inside diameter of the coiled tubing and seal means are provided on the first end for sealing between the first end and the inside of one end of the coiled tubing. A mandrel is provided having first and second ends and having a bore therethrough. The first end of the mandrel includes collet fingers. Coacting ratchet means are provided on the fingers and the inside of the first end of the body for locking engagement of the mandrel with the body. Slip means abut the first end of the body and are engagable with the outside of the mandrel and the slip means includes a plurality of outwardly directed teeth for engaging the inside of the coiled tubing. Coacting wedge surfaces are provided on the inside of the slip means and the outside of the mandrel for wedging the slip means into the inside of the coiled tubing when the body longitudinally moves the mandrel by the coacting ratchet means.

Still a further object of the present invention is wherein the coacting ratchet means is a thread.

Still a further of the present invention is wherein the outwardly directed teeth are directed towards the first end of the body.

Still a further object of the present invention is the provision of a well connector connectable to the inside of one end of two well coiled tubing for coupling a first coiled tubing to a second coiled tubing. The connector includes a circular body having first and second ends, having a bore therethrough, and an outside diameter of a size no greater than the outside diameter of the coiled tubing. The first end and the second end of the body each have an outside diameter substantially equal to the inside diameter of the first and second coiled tubing, respectively. Seal means are provided on the first end of the body and on the second end of the body for sealing between the first end of the body and the inside of the one end of the first coiled tubing and sealing between the second end of the body and the inside of the one end of the second coiled tubing. First and second mandrels are provided, each having first and second ends, and each having a bore therethrough. Coacting ratchet means are provided between the first end of the first mandrel and the first end of the body for locking engagement of the first mandrel with the body. Coacting ratchet means are provided between the first end of the second mandrel and the second end of the body for locking engagement of the second mandrel with the body. First and second slip means are provided abutting the first and second ends of the body, respectively, and engaging the outside of the first and second mandrels, respectively. Coacting wedge surfaces are provided between the slip means and the coacting mandrels for wedging the slips into engagement with the inside of the coiled tubings on longitudinal movement of the body. Preferably, the coacting ratchet means are threads which are outwardly directed teeth. The teeth on the first slip means are directed towards the first end of the body and the teeth on the second slip means are directed towards the second end of the body for moving into the coiled tubing, but locking and gripping the coiled tubing in a reverse direction.

Yet a further object of the present invention is the provision of a method of coupling one end of the first and second coiled tubing together which includes longitudinally inserting first slip means, positioned on first wedge means, into the inside of one end of the first coiled tubing by moving a body having a ratchet connection to the first wedge means. The method includes longitudinally inserting second slip means, positioned on second wedge means, into the inside of one end of the second coiled tubing, by moving the body which has a ratchet connection to the second wedge means. Thereafter, the method includes pulling the body from the end of the first and second coiled tubings thereby pulling the first and second wedge means and setting the first and second slip means in the first and second coiled tubing, respectively, and thereafter inserting the body into the ends of the first and second coiled tubings and ratcheting the body together with the first and second wedge means.

Yet a further object of the present invention is wherein the first and second slip means are inserted into the first and second coiled tubing by the body until the body abuts the ends of the first and second coiled tubing.

Still a further object of the method of installation is again pulling the body from the ends of the first and second coiled tubing and again inserting the body into the ends of the first and second coiled tubing for more securely gripping the first and second coiled tubing with the first and second slip means, respectively. Preferably, the method includes wherein the step of again pulling the body is with a greater longitudinal force than the first step of pulling the body for more securely setting the slips.

Other and further objects, features and advantages will be apparent from the following description of a presently preferred embodiment of the invention, given for the purpose of disclosure, and taken in conjunction with the accompanying drawings.

BRIEF DESCRIPTION OF THE DRAWINGS

FIGS. 1A and 1B are continuations of each other and form an elevational view, in cross section, of the present invention in the first step of being connected between the ends of first and second coiled tubing, FIGS. 2A and 2B are continuations of each other and form an elevational view, in cross section, of a second step in installing the connector of the present invention, FIGS. 3A and 3B are continuations of each other and form an elevational view, in cross section, of a third step in which the connector of the present invention is set in the ends of the two coiled tubings, FIG. 6 is a cross-sectional view, taken along the line 6—6 of FIG. 2A.

DESCRIPTION OF THE PREFERRED EMBODIMENT

Figure 4A:
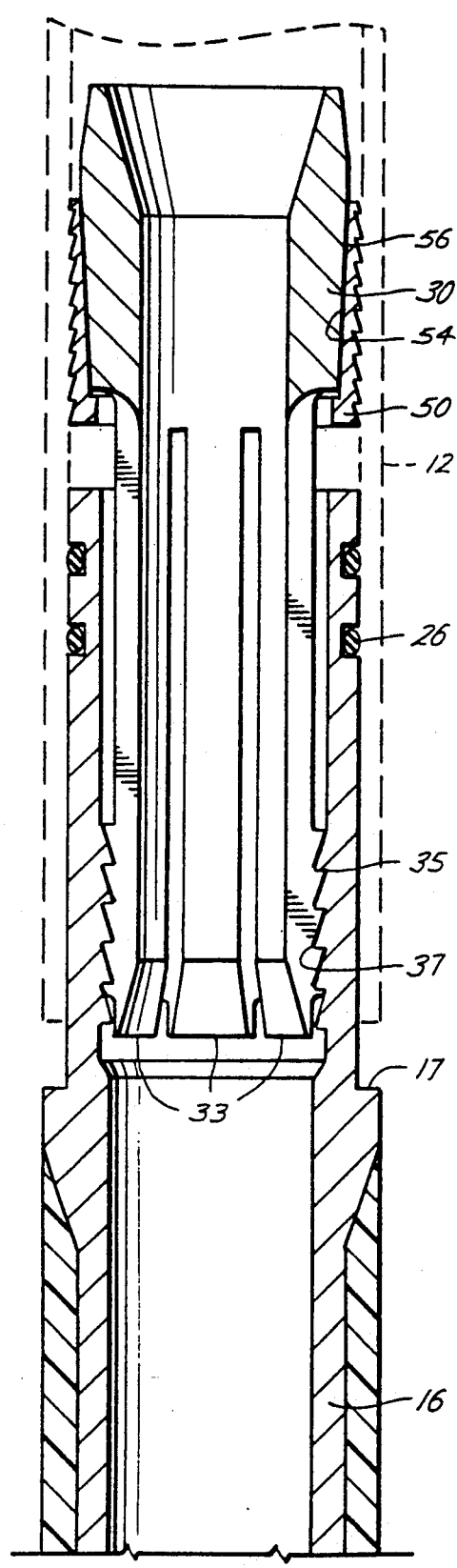
FIGS. 4A and 4B are continuations of each other and form an elevational view, in cross section, of the present invention in a fourth step of operation, if desired, for increasing the engaging capacity of the connector.

While the present invention will be described as connecting the ends of first and second coiled tubing together, for purposes of illustration only, it is to be recognized that the present ratchet type connector may also be used to connect a suitable well tool to one end of a coiled tubing by using only one-half of the connector.

Referring now to the drawings, and particularly to FIGS. 1A and 1B, the reference numeral 10 generally indicates the metal well connector of the present invention, as initially positioned, but unset, in the inside of one end of a first and second well coiled tubing 12 and 14, shown in dotted outline. The connector 10 includes a circular metal body 16 having a first end 18 and a second end 20 and a bore 22 therethrough for the passage of fluids. The body 16 has an outside diameter 24 of a size no greater than the outside diameter of the coiled tubing 12 and 14. Therefore, the body 16 does not upset or protrude past the outside diameter of the coiled tubing 12 and 14 and thus passes freely through coiled tubing injector chains around goosenecks, and onto a coiled tubing spool (not shown). The first end 18 of the body 16 and the second end 20 of the body 16 have an outside diameter substantially equal to the inside diameter of the first and second coiled tubing 12 and 14, respectively.

Seal means, such as O-ring seals 26 and 28, are provided on the first end 18 of the body 16 and also on the second end 20 of the body 16, respectively, for sealing between the first end 18 and the inside of the first coiled tubing 12 and for sealing between the second end 20 of the body 16 and the inside of the second coiled tubing 14, respectively. The O-rings 26 and 28 since they reduce and weaken the strength of the body 16 are placed adjacent the ends of the body 16 so as to be less subject to bending and breakage of the body 10 when the connector 16 is spooled on a reel. The length of the body, its internal diameter and is outside diameter are designed so that the connector 10 can withstand a number of spool cycles 7ithout losing pressure and tensile integrity.

In the preferred embodiment, the outside diameter of the metal part of the body 16 is substantially equal to the inside diameter of the coiled tubing 12 and 14. This allows the body 16 to be thin and flexible so as to be spoolable on a reel. An elastomer or plastic coating 13, such as sold under the trademark "HALAR 200", for example, is bonded to the exterior of the metal portion of the body 16. The coating 13 has an outside diameter substantially equal to the outside diameter of the coiled tubing 12 and 14.

A first mandrel 30 has a first end 32 and a second end 34 and is provided with a bore 36 therethrough in communication with the bore 22. The first and 32 of the first mandrel 30 includes a plurality of collet fingers 33 and coacting ratchet means on the fingers and the inside of the first end 18 of the body 16. Thus, the collet fingers 33 include a plurality of ratchet teeth 35 which coact with ratchet teeth 37 on the inside of the body 16. Thus, the mandrel 30 may ratchet into the bore 22 of the body 16 but cannot longitudinally move out of the body 16. Preferably, the coacting ratchet teeth 35 and 37 are threads, which are useful, not for setting the connector 10, but for retrieving the connector 10, if desired, as will be more fully described hereinafter. A second mandrel 40 includes a first end 42 and a second end 44 with a bore 46 therebetween in communication with the bore 22. The first end 42 of the mandrel 40 includes a plurality of collet fingers 43. Coacting ratchet means are provided on the outside of the fingers 43 and on the inside of the second end 20 of the body 16. Thus, ratchet teeth 45 are provided on the exterior of the collet fingers 43 and teeth 47 on the inside of the body 16. Preferably, the teeth 45 and 47 are coacting threads. Therefore, the mandrels 30 and 40 may longitudinally move towards the body 16, but are prevented from moving away from the body 16 by the coacting ratchet teeth.

First slip means 50 abuts the first end 18 of the body 16 and is engagable with the outside of the first mandrel 30. The slip means 50 includes a plurality of outwardly directed teeth 52 which are preferably directed towards the first end 18 of the body 12 and towards the end of the first coiled tubing 12. A second slip means 60 is provided abutting the second end 20 of the body 16 and is engagable with the outside of the second mandrel 40. The slip means 60 includes a plurality of outwardly directed teeth directed towards the end 20 of the body 16 and towards the end of the coiled tubing 14. Thus, it is noted that when the slips 50 and 52 are inserted into the coiled tubings 12 and 14, respectively, the slip means 50 and 52 travels into the ends of the coiled tubings 12 and 14, but not out of the ends of the coiled tubing 12 and 14.

Coacting wedge surfaces are provided on the inside of the first slip means 50 and on the outside of the first mandrel 30 such as wedge surface 54 on the slip means 50 and wedge surface 56 on the outside of the mandrel 30. The wedge surfaces 54 and 56 wedge the first slip means 50 into the inside of the first coiled tubing 12 when the body 16 is longitudinally pulled out of the end of the coiled tubing 12 thereby pulling the mandrel 30 by the coacting engaging ratchet teeth 35 and 37. Similarly, second coacting wedge surfaces are provided on the inside of the second slip means 60 and the outside of the second mandrel 40 such as wedge surface 64 on the inside of slip means 60 and wedge surface 66 on the outside of mandrel 40 for wedging the second slip means 60 into the inside of the second coiled tubing 14 when the body is longitudinally pulled out of the second coiled tubing 14.

Referring now to FIG. 6 it is to be noted that the coiled tubing, such as coiled tubing 12, when manufactured, may include a conventional longitudinal weld 11 running the length of the tubing. Preferably, this weld flash adjacent the ends of the coiled tubing is removed to allow the connector body 16 and the seals 26 and 28 to be inserted into the end of the coiled tubings 12 and 14. While the weld flash 11 may be removed past the setting point of the slip means 50 and 60, the slip means 50 and 60 may include a longitudinal groove, such as 51, at one circumferential location to clear the weld flash 11 inside of the coiled tubing. The longitudinal grooves 51 also allow the slip means 50 and 60 to be circumferentially compressed outwardly insuring a snug grip on the inside surface of the coiled tubing 12 and 14 during connection of the connector 12. The mandrels 30 and 40 may also include a longitudinal groove such as 31 along their length to clear the weld flash 11.

In use, the connector 10 is made up, as best seen in FIGS. 1A and 1B, with both mandrels 30 and 40 having a minimum number, such as three or four sets of teeth 35 and 45 engagable with the teeth 37 and 47, respectively on the body 16. The ends 18 and 20 of the body 16 are longitudinally inserted into the ends of the coiled tubing 12 and 14, as best seen in FIGS. 1A and 1B. Preferably, the body 16 is inserted into the ends of the coiled tubing 12 and 14 until a shoulder 17 on the body 16 contacts the end of the coiled tubing 12 and a shoulder 19 on the body 16 contacts the end of the coiled tubing 14. This positions the slips 50 and 60 at the proper locations in the coiled tubing 12 and 14, respectively, since the slips 50 and 60 abut the ends 18 and 20 of the body 16.

Referring now to FIGS. 2A and 2B, a longitudinal pull is exerted on the coiled tubings 12 and 14 in a direction to withdraw the body 16 from the ends of the coiled tubing 12 and 14, preferably with a predetermined maximum force such as 1000 pounds of axial tensile force. Because of the engagement between the teeth 35 and 37 and the teeth 45 and 47, the mandrels 30 and 40 are moved towards the ends of the coiled tubing 12 and 14, respectively, causing the wedge surfaces 56 and 66 to coact with the wedge surfaces 54 and 64 on the slips 50 and 60, respectively, to generate a firm grip between the slips 50 and 60 and the inside of the coiled tubings 12 and 14.

Figure 4B:
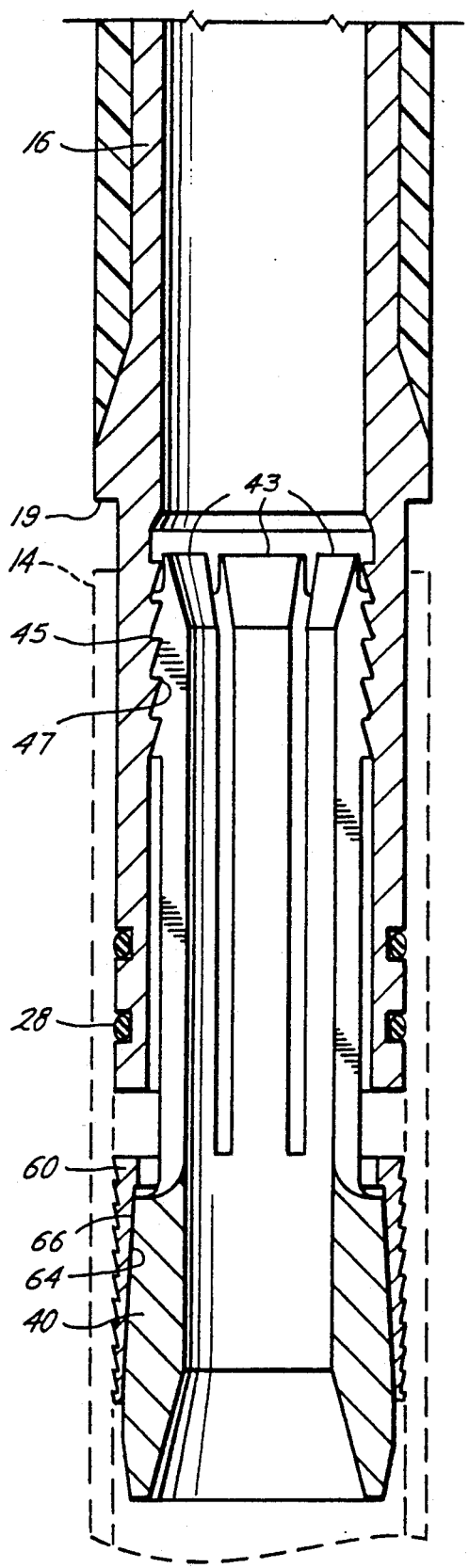
Figure 5A:
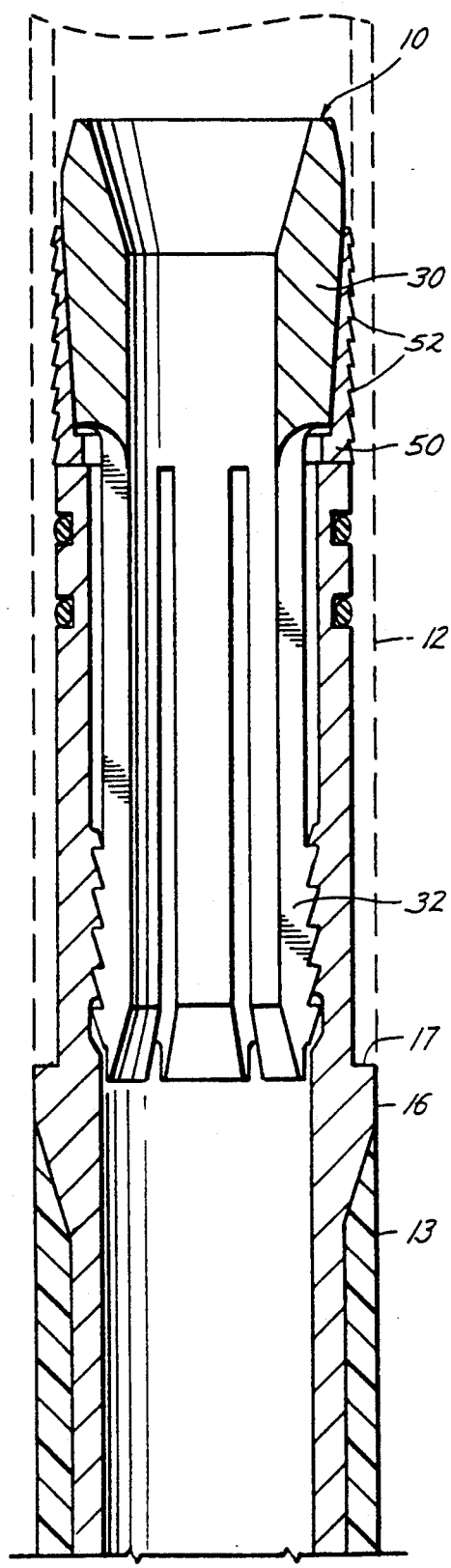
FIGS. 5A and 5B are continuations of each other and form an elevational view, in cross section, of the connector of the present invention in a fully set position.
Figure 5B:
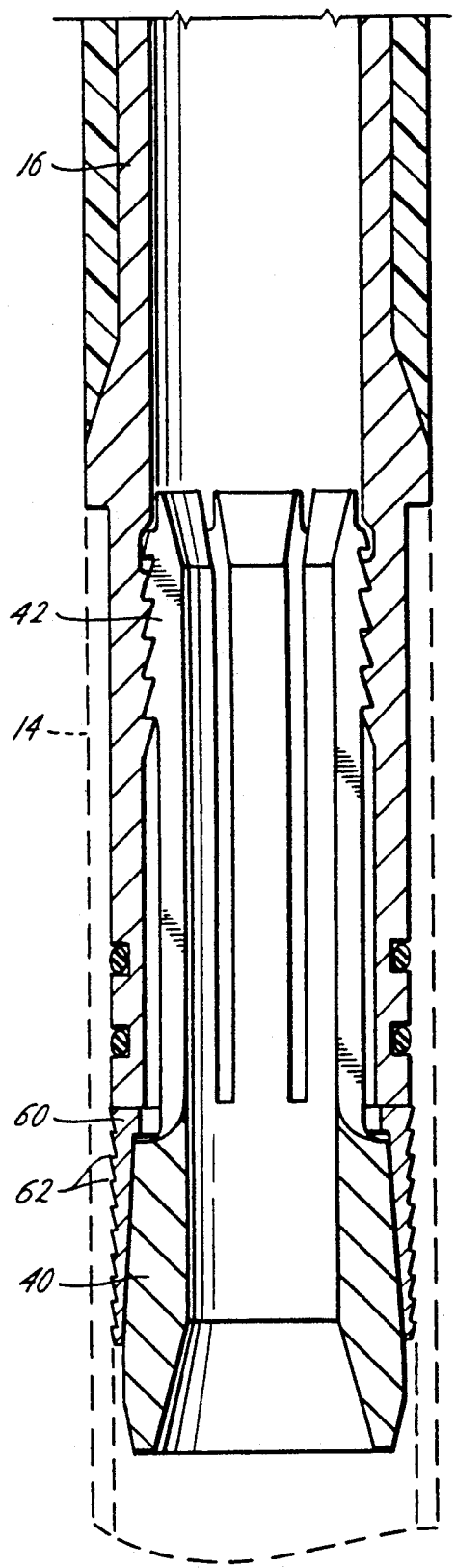

Referring now to FIGS. 3A and 3B, the longitudinal force on the connector 10 is alternated to provide a compressive force acting on the coiled tubing 12 and 14 moving them together to cause them to again abut the shoulders 17 and 19 on the body 16. This allows the ratchet teeth 35 and 37 between the mandrel 30 and the body 16 and the ratchet teeth 45 and 47 between the mandrel 40 and the body 16 to ratchet together to more securely hold the mandrel 30 and 40 in a building position between the slips 50 and 60. The connector 10 appears to be set in FIGS. 3A and 3B in position gripping and holding the coiled tubings 12 and 14 together. However, it is preferable to again alternately apply tension and compression across the connector 10 to apply a greater gripping force on the slips 50 and 60. Thus, as best seen in FIGS. 4A and 4B, tension has been applied across the body 16 again by separating the coiled tubing 12 and 14 to again exert a pull on the mandrels 30 and 40 through the ratchet teeth 35 and 37 and the teeth 45 and 47, respectively. Preferably, a much higher tensile force is exerted on the connector 10 than during the step in FIGS. 2A and 2B. For example, a tensile strength of up to 70% of the tensile yield of the coiled tubing is applied across the connector 10. This firmly locks the slips 50 and 70 inside the coiled tubing 12 and 14, respectively. Again, a compressive force is applied across the connector 10, as best seen in FIGS. 5A and 5B to ratchet the body 16 into a shoulder engagement with the coiled tubing 12 and 14 and then allowing the ratchet teeth 35 and 37 and 45 and 47 to securely hold the mandrels 30 and 40 in a set and locked position.

While, of course, the connector 10 may be installed into the ends of coiled tubing 12 and 14 in any suitable environment, it is convenient to make the assembly by inserting the connector 10 into the coiled tubing 12, feeding the coiled tubing 12 through an injector (not shown) to insert the lower end of the connector 10 into the coiled tubing 14 then thereafter to provide the alternate tension and compression forces through the well injector.

In the event that it is ever desired to disconnect the coiled tubing 12 and 14, this can be done by cutting the coiled tubing 12 and 14, respectively, above the connector 10 and below the connector 10. The connector 10 may then be disassembled, retrieved, reworked and reused by unthreading the mandrels 30 and 40 from the body 16 by unscrewing the threaded connections 35 and 37 and 45 and 47 with a suitable gripping tool.

While the present invention has been described as a connector 10 connecting the ends of two coiled tubing 12 and 14 together, one-half of the connector 10 may be used to connect a suitable well tool through one end of a coiled tubing as more fully described in copending patent application Ser. No. 988,089 in which the connector 10 uses only one mandrel 30, one slip means 50 and a suitable connection to the body 16 for connection to a well tool.

The present invention, therefore, is well adapted to carry out the objects and attain the ends and advantages mentioned as well as others inherent therein. While a presently preferred embodiment of the invention has been given for the purpose of disclosure, numerous changes in the details of construction, and steps of the method, will be readily apparent to those skilled in the art and which are encompassed within the spirit of the invention and the scope of the appended claims.

What is claimed is:

1. A well connector connectable to the inside of one end of well coiled tubing for coupling the coiled tubing to another member comprising,
- a circular body having first and second ends and a bore therethrough and an outside diameter of a size no greater than the outside diameter of the coiled tubing,
- said first end of the body having an outside diameter substantially equal to the inside diameter of the coiled tubing,
- seal means on the first end for sealing between the first end and the inside of the one end of the coiled tubing,
- a mandrel having first and second ends and having a bore therethrough, said first end of the mandrel having collet fingers,
- coacting ratchet means on the fingers and the inside of the first end of the body for locking engagement of the mandrel with the body,
- slip means abutting the first end of the body and engagable with the outside of the mandrel, said slip means including a plurality of outwardly directed teeth engaging the inside of the coiled tubing, and
- coacting wedge surfaces on the inside of the slip means and the outside of the mandrel for wedging the slip means into the inside of the coiled tubing when the body longitudinally moves the mandrel by the coacting ratchet means.

2. The connector of claim 1 wherein the coacting ratchet means is a thread.

3. The connector of claim 1 wherein the outwardly directed teeth are directed toward the first end of the body.

4. A well connector connectable to the inside of one end of two well coiled tubing for coupling a first coiled tubing to a second coiled tubing comprising,
- a circular body having first and second ends and having a bore therethrough and an outside diameter of a size no greater than the outside diameter of the coiled tubing,
- said first end of the body and second end of the body each having an outside diameter substantially equal to the inside diameter of the first and second coiled tubing, respectively,
- seal means on the first end of the body and on the second end of the body for sealing between the first end of the body and the inside of the one end of the first coiled tubing and sealing between the second end of the body and the inside of the one end of the second coiled tubing,
- first and second mandrels each having first and second ends and each having a bore therethrough,
- coacting ratchet means between the first end of the first mandrel and the first end of the body for locking engagement of the first mandrel with the body,
- coacting ratchet means between the first end of the second mandrel and the second end of the body for locking engagement of the second mandrel with the body,
- first slip means abutting the first end of the body and engaging the outside of the first mandrel, said slip means including a plurality of outwardly directed teeth engaging the inside of the first coiled tubing,
- second slip means abutting the second end of the body and engaging the outside of the second mandrel, said second slip means including a plurality of outwardly directed teeth engaging the inside of the second coiled tubing,
- first coacting wedge surfaces on the inside of the first slip means and the outside of the first mandrel for wedging the first slip means into the inside of the first coiled tubing when the body is longitudinally moved away from the end of the first coiled tubing, and
- second coacting wedge surfaces on the inside of the second slip means and the outside of the second mandrel for wedging the second slip means into the inside of the second coiled tubing when the body is longitudinally moved away from the end of the second coiled tubing.

5. The connector of claim 4 wherein the coacting ratchet means are threads.

6. The connector of claim 4 wherein the outwardly directed teeth on the first slip means are directed toward the first end of the body, and the outwardly directed teeth on the second slip means are directed toward the second end of the body.

* * * * *